Sept. 7, 1937.   J. C. OGLE ET AL   2,092,083
APPARATUS FOR CUTTING OPENINGS BY ABRASION
Filed Jan. 21, 1937   3 Sheets-Sheet 1
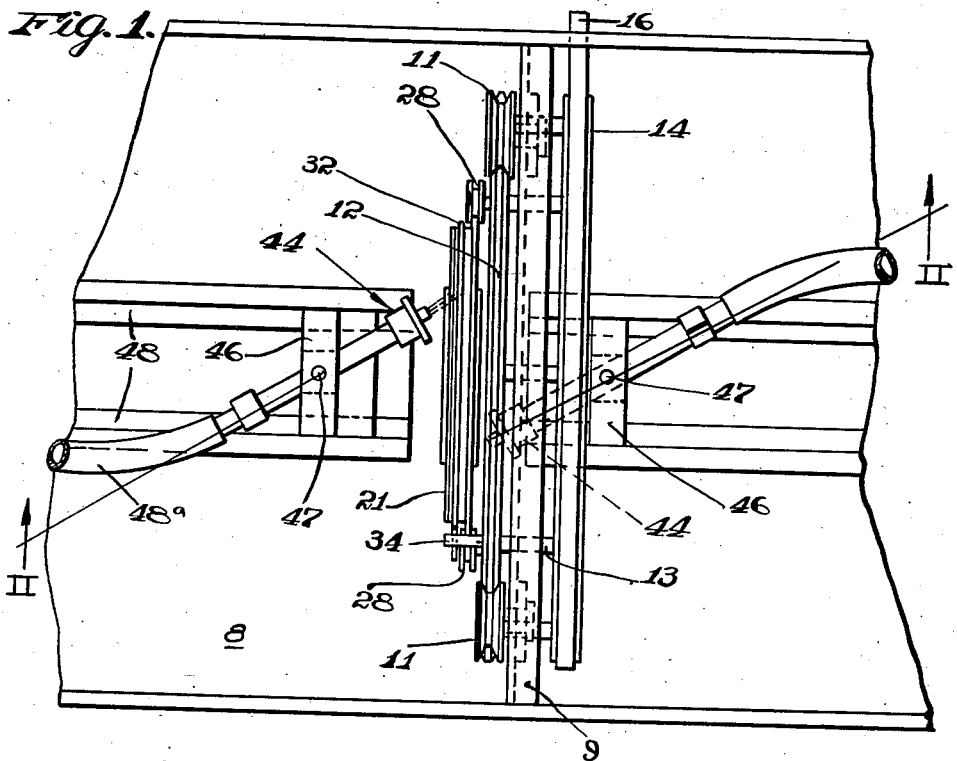
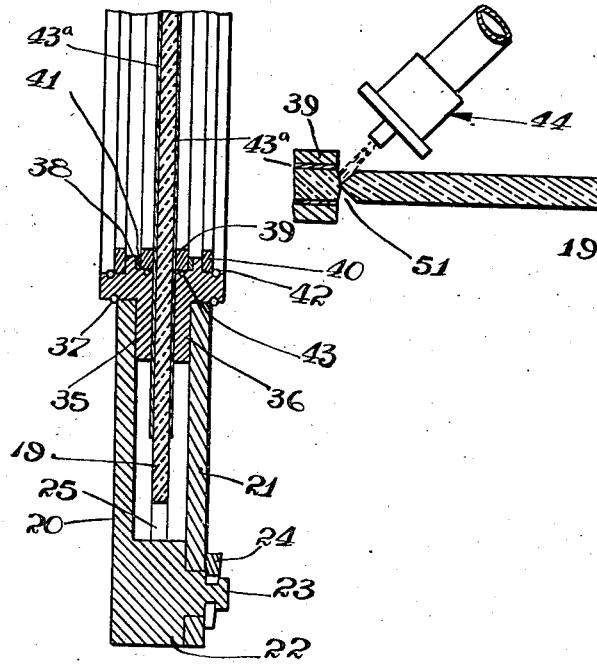
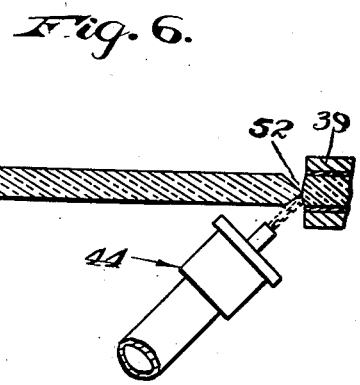
INVENTORS.
JAMES C. OGLE AND
ANDREW STRUB
BY
James C. Bradley
ATTORNEY.

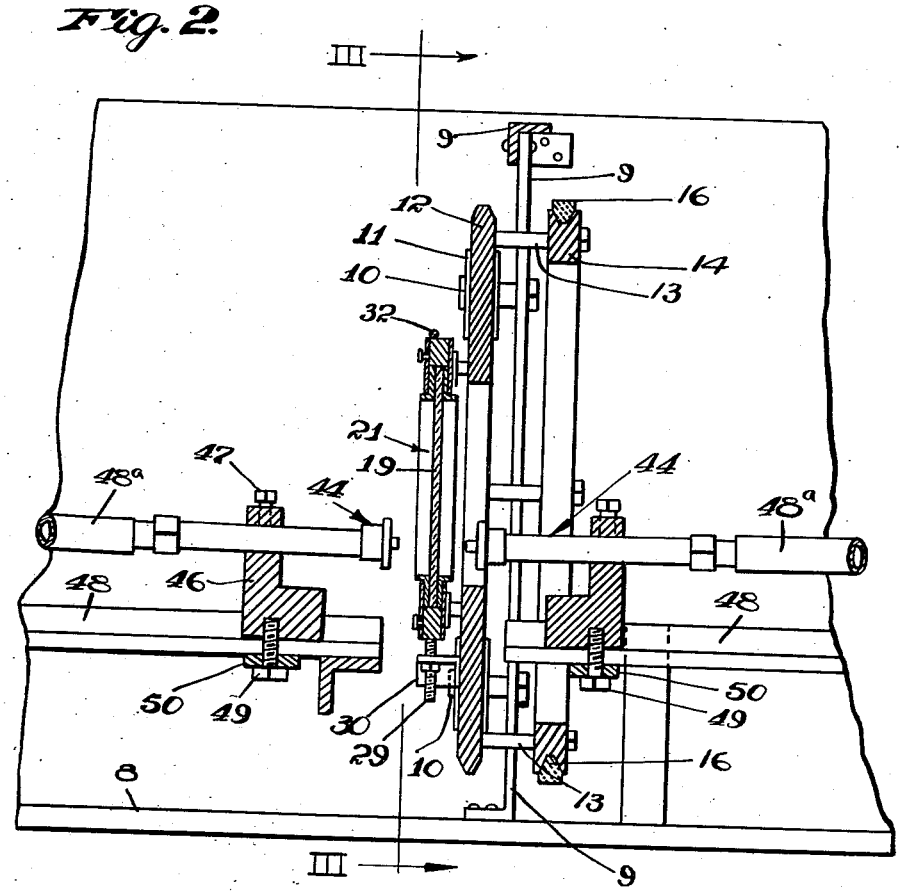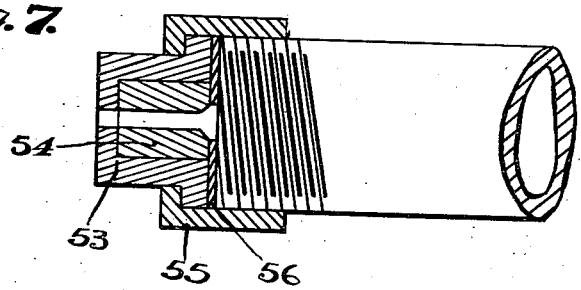

Sept. 7, 1937.   J. C. OGLE ET AL   2,092,083
APPARATUS FOR CUTTING OPENINGS BY ABRASION
Filed Jan. 21, 1937   3 Sheets—Sheet 3

INVENTORS
JAMES C. OGLE AND
ANDREW STRUB
BY James C. Bradley
ATTORNEY.

Patented Sept. 7, 1937

2,092,083

UNITED STATES PATENT OFFICE 2,092,083

APPARATUS FOR CUTTING OPENINGS BY ABRASION

James C. Ogle and Andrew Strub, Brackenridge, Pa., assignors to Liberty Mirror Works, a corporation of Pennsylvania Application January 21, 1937, Serial No. 121,545

9 Claims. (Cl. 51—278)

Figure 3:
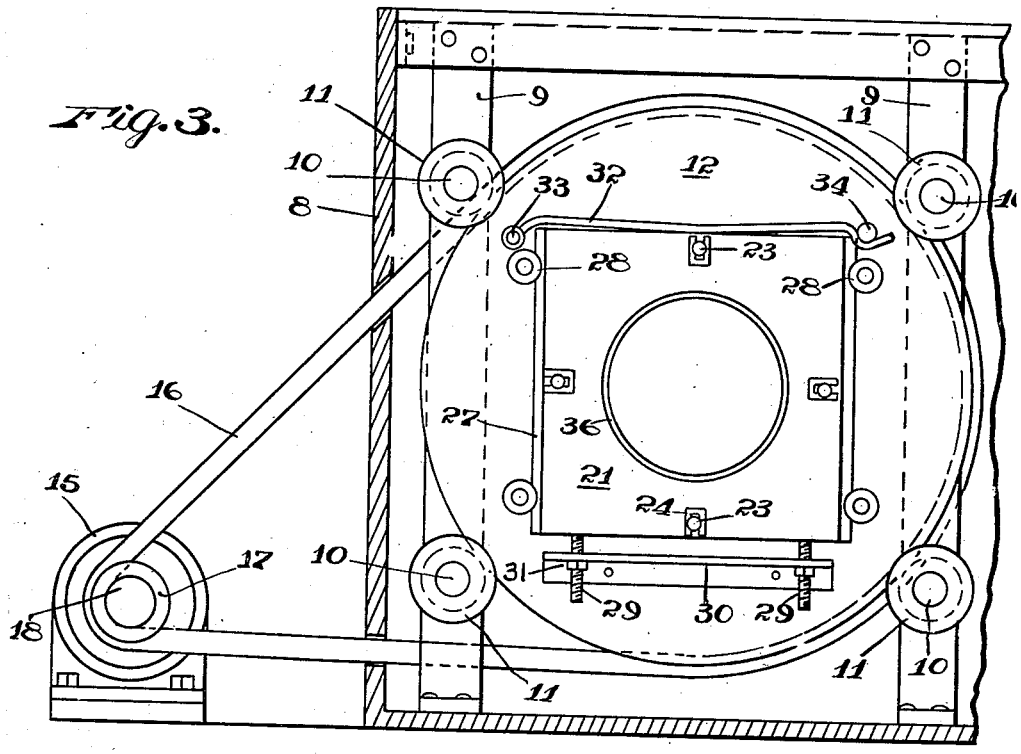
Figure 4:
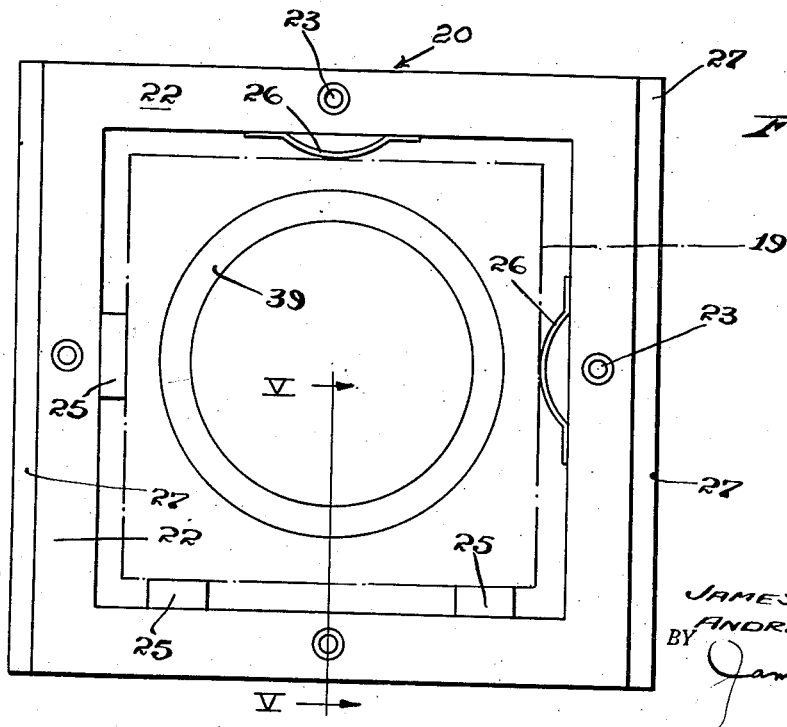

The invention relates to apparatus for cutting openings in hard abradable material, such as glass, by the use of sand blast means or the like. The invention has for its principal objects the provision of an improved means whereby openings of any size may be cut rapidly and accurately at a low cost; the provision of improved means for supporting the sheets to be cut with the parts which are exposed to the action of the abrasive readily replaceable at a small cost; and the provision of improved means for supporting the sheets to be cut so that any clouding of the material outside the line of cut is avoided. In the set up, as illustrated and described hereinafter, the apparatus is employed for cutting circular openings and the plate to be cut is rotated relatively to two fixed sand blast nozzles, but it will be understood that the relative movement may be so arranged as to cut openings other than circles, that the relative movement might be given to the nozzles instead of the plate, and that the number of nozzles may be increased or decreased as desired. One embodiment of the invention is shown in the accompanying drawings, wherein:

Figure 1 is a plan view. Fig. 2 is a section on the line II—II of Fig. 1. Fig. 3 is a section on the line III—III of Fig. 2. Fig. 4 is a front elevation of one of the halves of the holder for the glass plate. Fig. 5 is a section through the holder on the line V—V of Fig. 4. Fig. 6 is an enlarged sectional view showing the character of the cutting action of the sand blasts and the angle at which they operate. And Fig. 7 is an enlarged section through one of the nozzles.

Referring to the drawings, 8 is the framework of the machine, on which is mounted a pair of vertical brackets 9, 9. Bolted to these brackets are the spindles 10, 10, 10, 10 carrying the grooved wheels 11, 11, 11, 11. These wheels engage and support for rotation the circular plate 12, which has bolted to it in spaced relation by means of the studs 13 (Fig. 2), a grooved ring or pulley 14. The pulley and the plate 12 secured thereto are rotated from an electric motor 15 (Fig. 3) mounted at one side of the framework by means of a belt 16 passing around the pulley 14 and a pulley 17 carried by the shaft 18 driven from the motor through a suitable reducer.

The glass plate 19, which as shown is square (Fig. 4), and is to have a central circular portion removed, is supported in a frame or holder consisting of the rectangular metal plates 20 and 21 open at their central portions and having the glass plate clamped therebetween. The plate 20 has integral with one side the flange 22 carrying four pins 23 which project through openings in the plate 21. The shanks of these pins are straddled by the U shaped wedges 24 which fit beneath the heads of the pins, thus locking the plates 20 and 21 together. As indicated in Fig. 4, the glass plate is positioned inside the flange 22 of the plate 20 by means of the three blocks 25, 25, 25 and the two leaf springs 26, 26. The vertical edges 27, 27 (Fig. 4) of the plate 20 project beyond the flanges 22 and are received in the grooved rollers 28, 28, 28, 28 (Fig. 3) which are mounted on studs projecting from the front face of the rotatable plate 12. The bottom edge of the plate 20 is at such time engaged by the pair of stop screws 29, 29 threaded through a bracket 30 projecting from the front face of the plate 12, such screws being held in position by the lock nuts 31. The plate 20 is locked against upward movement by the bar 32 pivoted at one end on a stud 33 carried by the plate 12 and hooked at its other end beneath another stud 34 also carried by the plate 12.

Secured in the circular openings in the plates 20 and 21 are the metal collars 35 and 36, such collars being secured releasably in position by split members 37 (Fig. 5) of spring wire fitting in grooves in the collars. An annular shoulder 38 is provided on each collar and on opposite sides of these shoulders are mounted the metal wear rings 39 and 40, a yielding rubber washer 41 being interposed between the shoulders and the wear rings 39. The wear rings 40 are secured releasably in position by spring wire members 42 similar to the members 37. The rings 39 are maintained in place by spring wire members 43 fitting in grooves in the collars and yieldingly engaging the outer faces of the rings. Sheets of paper 43a are interposed between the surfaces of the glass sheets and the members 35 and 36. The portions of these sheets lying inside the confines of the rings 39 may be torn out before the sand blasting operation begins, as the purpose of the sheets is merely to provide washers between the faces of the wear rings 39 and the faces of the glass sheets. This prevents any scratching of the glass sheet by the metal parts and prevents any penetration of sand between the rings 39 and the glass. If the paper washers are not used, there is a penetration of the sand particles between the rings and the glass, thus producing a clouding effect on the surfaces of the glass sheet for a slight distance back from the edge of the opening which is cut in the plate. Further, if the plate has been silvered, the silver film next to the opening is injured by the sand.

In using the device, as later described, the sand blasts are directed against the glass sheets at the rings 39, so that they must be replaced from time to time, due to the abrading action of the sand, otherwise the inside diameter of the rings will be increased and the size of the hole cut in the glass plate which is determined by such inside diameter, will be increased. The arrangement, as shown and described, permits a ready replacement of the rings. The shoulders 38 which hold the rings 39, would also be cut away by the sand, if not protected, and such protection is afforded by the wear rings 40 which are also readily replaceable. The rubber washers 41 hold the rings 39 with their faces slightly in advance of the planes of the inner faces of the collars 35 and 36, so that when the parts are clamped in assembled position, a yielding pressure is provided between the rings 39 and the glass plate, thus giving a better sealing effect between the rings and glass than would be the case if the rings were rigidly supported against the shoulders 38.

A sand blast nozzle 44 is provided on each side of the holder for the glass plate. These nozzles are connected to a suitable apparatus for supplying sand under air pressure by means of the pipes 48a, and are supported on blocks 46 in which they are clamped by the set screws 47. The blocks 46 are mounted in a guideway consisting of a pair of angles 48 carried by the framework of the machine, and are clamped in any desired position of adjustment by screws 49 extending through plates 50 extending transversely of the guideways and engaging the lower sides of the angles 48. The nozzles are preferably inclined at an angle of about 60 degrees to the plane of the glass sheets, and are so positioned that the blasts strike the glass at the inner boundaries of the rings 39 which determine the limits of the opening cut in the plate. During the cutting operation, the plate 12 carrying the glass and the holder is rotated slowly until the sand blasts cut the grooves 51 and 52 (Fig. 6), each extending half way through the plate, so that the portion inside the grooves is separated from the body of the plate. A satisfactory speed of rotation of the plate is one revolution in 30 seconds, and under normal operating conditions, the cutting of a quarter inch sheet of glass is accomplished in two revolutions of the plate, so that the cutting operation takes about one minute. If the number of nozzles is increased, the cutting time may be correspondingly decreased. It is possible to cut the plate with one nozzle, or by a plurality of nozzles working only on one side of the glass plate, but this is not desirable, as a slight bevel is produced in the wall of the opening cut in the plate, and it is better to divide this bevel into two parts meeting at the center plane of the plate, than to produce an opening which has a greater diameter at one face of the glass plate than at the other, which is the result produced by cutting from one side only.

The nozzle used is preferably of the construction shown in Fig. 7, in which 53 is a sleeve carrying a plug 54 and clamped in position by a collar 55, a washer 56 being interposed between the end of the supply pipe and the sleeve. The only parts which will wear out, under the abrasive action of the sand, are the plug 54 and washer 56, which are readily replaceable at a small cost.

It will be understood that the portion of the plate which is to be utilized or saved lies between the shields 39, 39 and outside the line of cut. The central disc which is separated from the body of the glass sheet is practically waste glass, as the sharp bevel and clouding at its edges, due to the sand blast, makes it unserviceable in the form in which it is cut out. The discs may be utilized, however, by trimming off the edges by the use of a glass scoring tool.

What we claim is:

1. In combination in sand blast apparatus, a frame member in which a plate of hard material to be cut is clamped having an opening whose boundary corresponds to that of the hole to be cut in the plate, a sand blast nozzle member mounted at an acute angle to the plane of the plate and directed at the plate at said boundary, and means for giving one of said members a movement of rotation about the center of said opening.

2. In combination in sand blast apparatus, a pair of frame members between which a plate of hard material to be cut is clamped, such members having a pair of opposing openings whose boundaries correspond to that of the hole to be cut in the plate of hard material, a pair of sand blast nozzle members mounted one on each side of the frame members at an acute angle to the plane of the plate of hard material and directed at such plate at said boundaries, and means for giving one of said pair of members a movement of rotation about the center of said openings.

3. In combination in sand blast apparatus, a rotatable frame in which the plate to be cut is clamped having an opening whose boundary corresponds to that of the hole to be cut in the plate, a sand blast nozzle mounted at an acute angle to the plane of the plate and directed at the plate at such boundary, and means for giving the frame a movement of rotation about the center of said opening.

4. In combination in sand blast apparatus, a rotatable frame comprising two plates between which a plate of hard material to be cut may be clamped, such plates having a pair of similar opposing openings whose boundaries correspond to that of the hole to be cut in the plate of hard material, a pair of sand blast members mounted one on each side of the frame at an acute angle to the plane of the plate of hard material and directed at said boundaries, and means for giving said frame a movement of rotation.

5. In combination in sand blast apparatus, a rotatable frame comprising two plates between which a plate of hard material to be cut may be clamped, such plates having a pair of similar opposing openings, a wear ring secured releasably in each of said openings having an internal diameter corresponding to that of the opening to be cut in the plate of hard material, a pair of sand blast nozzles mounted one on each side of the frame at an acute angle to the plane of the plate of hard material and directed at such plate just inside said rings, and means for rotating the frame.

6. In combination in sand blast apparatus, a rotatable frame comprising two plates between which a plate of hard material to be cut may be clamped, such plates having a pair of similar opposing openings, an annular shoulder on each plate surrounding the opening and spaced back from the inner face thereof, a pair of wear rings secured releasably in each of said openings, one on each side of said shoulder, said rings having an internal diameter corresponding to that of the opening to be cut in the plate of hard material, a pair of sand blast nozzles mounted one on each side of the frame at an acute angle to the plane of the plate of hard material and directed at such plate just inside said rings, and means for rotating the frame.

7. In combination in sand blast apparatus, a rotatable frame comprising two plates between which a plate of hard material to be cut may be clamped, such plates having a pair of similar opposing openings, a wear ring secured releasably in each of said openings having an internal diameter corresponding to that of the opening to be cut in the plate of hard material, washers of paper between the wear rings and the surface of the plate of hard material, a pair of sand blast nozzles mounted one on each side of the frame at an acute angle to the plane of the plate of hard material and directed at such plate just inside said rings, and means for rotating the frame.

8. In combination in sand blast apparatus, a frame comprising two metal plates between which a plate of hard material may be clamped, such metal plates having a pair of similar opposing openings, an annular shoulder on each metal plate surrounding the opening therein and spaced back from the face of the plate, a pair of wear rings secured releasably in each of said openings, one on each side of said shoulder, said rings having an internal diameter corresponding to that of the opening to be cut in the plate of hard material, a washer of resilient material between each of said shoulders and the inner ring of each pair, and a sand blast nozzle on each side of the frame directed into the openings in the metal plates.

9. In combination in sand blast apparatus, a frame comprising two metal plates between which a plate of hard material may be clamped, such metal plates having a pair of similar opposing openings, an annular shoulder on each metal plate surrounding the opening therein and spaced back from the face of the plate, a pair of wear rings secured releasably in each of said openings, one on each side of said shoulder, said rings having an internal diameter corresponding to that of the opening to be cut in the plate of hard material between each of said shoulders and the inner ring of each pair, washers of relatively soft packing material between the wear rings and the surface of the plate of hard material, and a sand blast nozzle on each side of the frame directed into the openings in the metal plates.

JAMES C. OGLE.
ANDREW STRUB.